(12) United States Patent
Cooper

(10) Patent No.: US 7,825,972 B2
(45) Date of Patent: Nov. 2, 2010

(54) PROCESSING METHOD DEVICE AND SYSTEM TO PRODUCE A FOCUSED IMAGE SIGNAL FROM AN UNFOCUSED IMAGE

(76) Inventor: Allan J. Cooper, c/o Digital World Corporation, 3607 172$^{nd}$ Ave, NE. Suite 1, Bellevue, WA (US) 98008

( * ) Notice: Subject to any disclaimer, the term of this patent is extended or adjusted under 35 U.S.C. 154(b) by 1400 days.

(21) Appl. No.: 11/247,825

(22) Filed: Oct. 11, 2005

(65) Prior Publication Data

US 2006/0091289 A1 May 4, 2006

Related U.S. Application Data

(60) Provisional application No. 60/617,139, filed on Oct. 8, 2004.

(51) Int. Cl.
*H04N 3/14* (2006.01)
*H04N 5/335* (2006.01)

(52) U.S. Cl. ............... 348/297; 348/222.1; 348/333.01; 348/348

(58) Field of Classification Search ............... 348/222.1, 348/294, 333.01, 349, 347; 382/254; 250/208.1; 378/147
See application file for complete search history.

(56) References Cited

U.S. PATENT DOCUMENTS 5,652,429 A * 7/1997 Genna ........................ 250/368
6,154,574 A * 11/2000 Paik et al. .................... 348/345
6,211,508 B1 * 4/2001 Liu ........................ 250/208.1
2001/0037184 A1 * 11/2001 Kobayashi ................... 702/150
2004/0023249 A1 * 2/2004 Balch ............................ 435/6
2006/0256226 A1 * 11/2006 Alon et al. ................... 348/335

OTHER PUBLICATIONS

Ng, Ren, et al. "Light Field Photography with a Hand-held Plenoptic Camera", Stanford Tech Report CTSR Feb. 2005 pp. 1-11.

* cited by examiner

*Primary Examiner*—Gevell Selby
(74) *Attorney, Agent, or Firm*—Bergman & Song LLP; Michael Bergman

(57) ABSTRACT

A method and apparatus are disclosed for forming an image signal by receiving a flux of photons at a convex photodetector such as a hemispherical photodetector. The convex photodetector includes a plurality of photosensors. Each photosensor has a different orientation with respect to a propagation vector of the flux of photons. The photosensors generate a respective plurality of intensity signals. Each of the intensity signals is related to the respective orientation of the photosensor that generates it. The intensity signals are received by a signal processor, such as a digital signal processor, which uses the intensity signals to compute an image signal related to the intensity signals and thereby produce a focused output image.

15 Claims, 14 Drawing Sheets

PROCESSING METHOD DEVICE AND SYSTEM TO PRODUCE A FOCUSED IMAGE SIGNAL FROM AN UNFOCUSED IMAGE

CROSS REFERENCE TO RELATED APPLICATIONS

The present application claims the benefit of U.S. provisional patent application Ser. No. 60/617,139, filed Oct. 8, 2004, the disclosure of which is herewith incorporated by reference in its entirety.

FIELD OF THE INVENTION

The present invention relates to imaging systems and more particularly to digital imaging systems.

BACKGROUND OF THE INVENTION

Conventional optical photographic and video cameras, telescopes and microscopes are used to display and/or record images. Such systems rely on reflective and refractive optical lenses. The refractive optical lenses serve to focus light within the systems. Typically, the lenses are made of glass or plastic, and exhibit fundamental characteristics substantially unchanged since the time of Galileo. Refractive optical lenses range in size from microscopic dimensions to meters across.

A refractive lens focuses an image by directing to a particular point on a focal plane photons originating at a corresponding point in an image plane. For purposes of discussion, the general lens problem may be simplified to the problem of a lens focused "at infinity."

Generally, incoherent light diverges from a light source. At large distances from the light source, however, this divergence becomes negligible. Consequently, light arriving at a receiving device from a source at a large distance from the receiving device arrives along substantially parallel rays. The distance from the image plane at which light rays appear substantially parallel depends on the characteristics of the system sensing the light. For a typical photographic camera focusing beyond approximately 40 feet is equivalent to focusing at infinity.

Unfocused light uniformly illuminates a plane disposed in the path of the arriving light rays. This uniform illumination carries less information content than a focused image, in which variation of light intensity across the focal plane corresponds to variation of light intensity at the image plane.

One simple apparatus for forming a focused image is a pinhole aperture disposed in a substantially opaque barrier where the opaque barrier is disposed in spaced relation to a reflective or translucent screen. A pinhole camera includes an opaque barrier having an aperture therein. The pinhole camera provides a focused image on a reflective, translucent or optically sensitive screen that is disposed in spaced relation to the barrier. The focused image is related to the distribution of light arriving from a distant image plane.

The barrier blocks all of the light arriving at the barrier from a particular light source except for the portion of that light arriving incident to the aperture. Light arriving at the aperture passes through the aperture and impinges on the screen. Light arriving from different light sources arrives at different solid angles with respect to the barrier, and accordingly illuminates correspondingly different regions of the screen.

A pinhole camera uses available light inefficiently. The image includes only light arriving directly at the aperture. Other light arriving at the barrier is absorbed by, or reflected from, the barrier and is thus unavailable for image formation. Furthermore, the resolution of the image on the screen is limited by aperture size. A small aperture forms a higher-resolution image than a large aperture. A smaller aperture, however, allows a smaller proportion of the light arriving from a particular source to pass through to the screen, while a correspondingly larger portion of the incident light is reflected or absorbed by the barrier.

A refractive lens uses incident light much more efficiently to form an image. Typically, light arriving along parallel rays from a distant source is collected across an entire surface of a refractive lens. Wherever the light impinges on the lens, it is redirected towards a point on a focal plane. In an ideal case, image resolution on the order of the wavelength of the incident light can be achieved, and the efficiency of the system is high, since most of the light incident on the surface of the lens is transferred to the focal plane, rather than being reflected or absorbed.

While refractive lens systems provide relatively high efficiency and resolution, they have significant disadvantages. The geometry of a refractive lens is constrained by the index of refraction of the material or materials of which the lens is formed, and by the refraction effects desired. Consequently, the shape and volume of a refractive lens system is constrained within certain parameters. In particular, the depth of the lens system may be non-negligible in the overall design of an optical system. To some extent lens system thickness may be reduced by applying fresnel lenses, however use of a fresnel system implies other design constraints. In addition, optical materials having desirable refractive characteristics may be relatively dense, resulting in correspondingly heavy focusing systems.

Recent years have witnessed significant advances in electronic imaging technology. In particular, the technology of charge coupled devices and CMOS photosensors has developed rapidly. CMOS devices are now available with significant integrated processing capability such that photosensor arrays and digital signal processing devices are mutually disposed on a common substrate. Consequently, electronic photosensors are now employed in a wide variety of imaging applications and apparatus.

With digital electronic photosensors has come improved methods of image storage. Images acquired by digital cameras are readily adapted to be stored and manipulated in digital format. Such manipulation includes postprocessing of images acquired by conventional image acquisition systems to extract information present, but not readily visible, in the original image. Various algorithms and mathematical transform techniques have been applied to the processing of images acquired through refractive lens systems. Nevertheless there remains a need for compact and light-weight image acquisition systems capable of acquiring images with reduced mechanical complexity. In view of these and other limitations, there exists an opportunity to advance the state of the art.

BRIEF DESCRIPTION OF THE INVENTION

It is desirable to have a focusing system adapted to receive light and produce a focused image or a signal corresponding to a focused image without the use of refractive or reflective optics. In addition, it is desirable to have a focusing system capable of operating at high efficiency with respect to detecting incident light. Further, it is desirable to have a focusing system that is readily manufacturable and relatively insensitive to manufacturing process variation. Moreover, it is desirable to have a focusing system that is adaptable to changing environmental influences, and readily reconfigurable for optimal response to particular application parameters. Further, it is desirable to have a focusing system that is light in weight and able to provide a high-resolution image with a reduced form factor. In a further aspect it is desirable to have a focusing system adapted to provide as an output, a signal readily stored or transmitted to a remote location.

A digital imaging system according to the invention includes a light gathering device and a computational infrastructure. The light gathering device must acquire angular and intensity information concerning incident light and the computational infrastructure must transform the acquired information into usable images. Accordingly, a digital imaging system according to the invention produces a focused image by computationally processing signals received from a photosensor device. In this way, the digital imaging system is able to create focused images without employing a refractive lens. By eliminating the need for refractive lenses, optical systems such as cameras may be produced which are smaller and lighter than comparable systems using conventional lenses.

A digital imaging system according to the invention is scalable, and is amenable to preparation by micro-fabrication techniques. In view of of the following disclosure, one of skill of the art would readily understand that digital lenses may be prepared in various sizes from microscopic scale upward. A sensor array of decimeter scale for a digital imaging system would be highly portable and maybe capable of gathering light more efficiently than a conventional system of comparable size and weight. As a result, lensless digital imaging systems are capable of high-speed image acquisition, low-light image acquisition, and high-resolution image acquisition.

The present invention relates to a digital system adapted to receive a first input signal and produce a second output signal corresponding to a focused representation of the first input signal. In one aspect, the present invention relates to a digital system adapted to receive an optical input signal and produce a visual output signal corresponding to a focused representation of the optical input signal. In a further aspect, the present invention relates to a computing system adapted to receive a plurality of electromagnetic waves and responsively produce an image corresponding to a spatial pattern of the electromagnetic waves.

These and other advantages and features of the invention will be more readily understood in relation to the following detailed description of the invention, which is provided in conjunction with the accompanying drawings.

DETAILED DESCRIPTION

Figure 1:
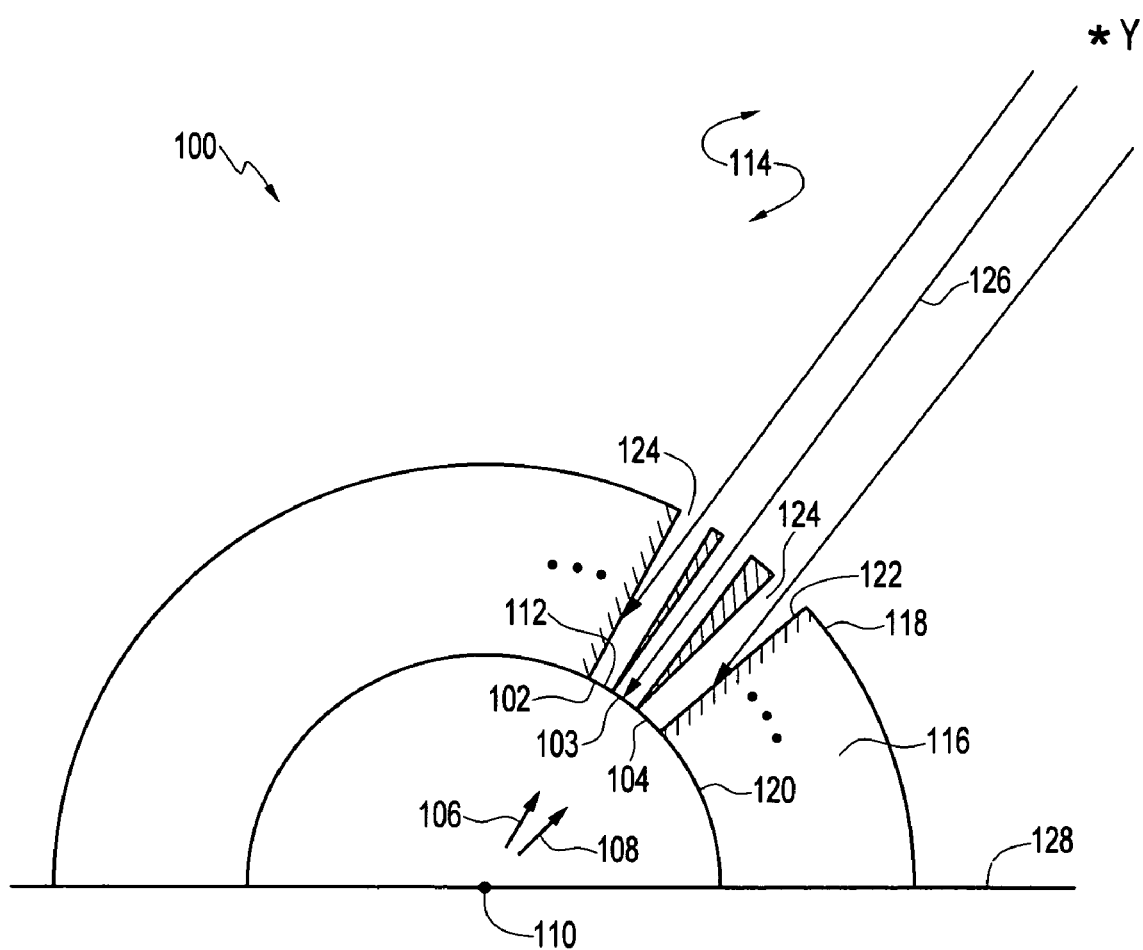
FIG. 1 shows, in cross-section, a portion of a digital imaging system with a collimated photosensor array.

The present invention will be described as set forth in the exemplary embodiments illustrated in FIGS. 1-15. Other embodiments may be utilized and structural or functional changes may be made without departing from the spirit or scope of the present invention. Like items are referred to by like reference numerals.

In a first aspect, the present invention relates to a digital imaging system adapted to receive an optical input signal from one or more remote active or passive light sources and produce an image output signal corresponding to the optical signal. The invention may include a display device adapted to display a visual image according to the image output signal, and may further include a storage device adapted to store the image output signal for display at another time. In one aspect, the invention includes a sensing system for sensing light intensity arriving from a plurality of directions with respect to the sensing system. According to one embodiment of the invention, the sensing system includes a plurality of photosensors oriented in a respective plurality of directions in relation to the sensing system.

Referring to FIG. 1 one sees, in cross-section, a hemispherical portion of a digital imaging system according to one embodiment of the invention. As shown in FIG. 1, the digital imaging system includes a photosensor array 100. The photosensor array 100 has a plurality of photosensors exemplified by photosensors 102, 103, 104.

In the photosensor array 100, photosensor 102 has a light-receiving surface 112 disposed in substantially normal relation to an orientation vector 106. Photosensor 104 is disposed in substantially normal relation to an orientation vector 108. The orientation vectors coincide with a respective plurality of lines that intersect at a common point 110, which point 110 defines a center of a hemisphere.

The light-receiving surface 112 of each photosensor is oriented to receive light from a region 114 outwardly of the light-receiving surface 112, as taken with respect to the center point 110. Each light-receiving surface 112 is disposed in a substantially tangent relation to the hemisphere such that the light-receiving surfaces 112, taken together, are approximately coincident with a portion of the surface of the hemisphere. Therefore, according to one embodiment of the invention, the combined light-receiving surfaces 112 of a plurality of photosensors, including photosensors 102-104 and others, form a piecewise approximation to a hemispherical surface.

According to the FIG. 1 embodiment, the digital imaging system includes a collimator 116. The collimator 116 includes an outer surface 118 and an inner surface 120. The collimator 116 also includes a plurality of bore surfaces 122 disposed between the outer surface 118 and the inner surface 120 and defines a respective plurality of collimation passages 124. According to one embodiment of the invention, the bore surfaces 122 each include a substantially circular cylindrical surface. According to one aspect of the invention, the bore surfaces 122 are adapted to absorb a substantial portion of any incident radiation including optical frequency electromagnetic radiation that impinges on the bore surface 122. According to a further aspect of the invention, the bore surfaces 122 are optimized to absorb electromagnetic radiation of a particular range of wavelengths.

The collimation passages 124 are sized and oriented to allow light rays 126 received from a particular solid angle with respect a reference plane 128 containing the center point 110 to impinge upon the light-receiving surface 112 of the corresponding photosensor 103. Light rays received from outside the particular solid angle do not arrive at the light-receiving surface 112, but impinge on, and are absorbed by, the bore surfaces 122 or the outer surface 118 of the collimator. Consequently, a photosensor signal is generated by the photosensor 103 that is related to an intensity of light arriving at the photosensor array 100 from light sources within a particular solid angle. By combining a plurality of such photosensor signals, the digital imaging system forms an output image signal corresponding to light arriving from an image plane.

As in the case of the pinhole camera, the amount of light received at any particular photosensor 103 of the FIG. 1 embodiment is limited by the size of the aperture formed by the corresponding collimation passage 124. Light arriving at a particular solid angle that does not pass through the collimation passage 124 is unavailable for imaging. As resolution of the FIG. 1 embodiment is increased, the proportion of incident light available for use by each photosensor is decreased correspondingly.

Figure 2:
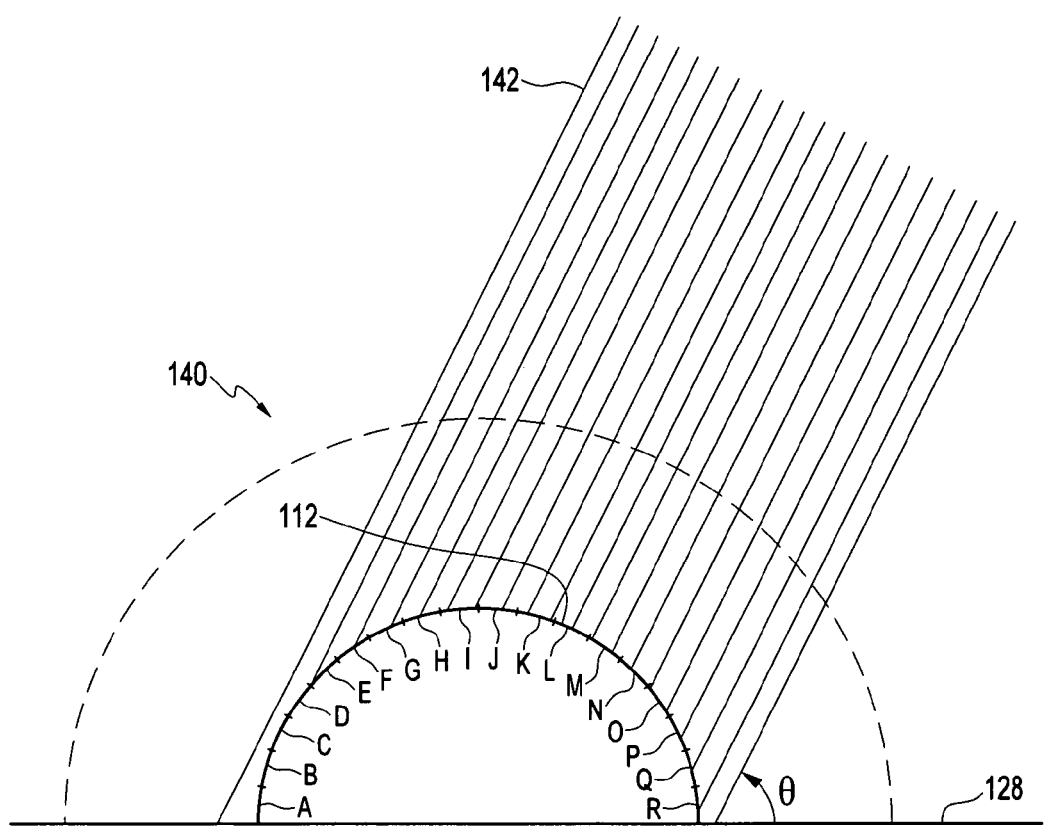
FIG. 2 shows, in cross-section, a portion of a digital imaging system with an un-collimated photosensor array.

FIG. 2 shows a further embodiment of the invention including a photosensor array 140. As shown, photosensor array 140 includes a plurality of photosensors A-R having a respective plurality of light-receiving surfaces disposed to form a piecewise approximation of a hemispherical surface. Light rays 142 arriving from light source Y at a particular solid angle Ω with respect to a reference plane 128 is received by more than one of the photosensors A-R. Since more of the light arriving at solid angle Ω is collected by the photosensors, the efficiency of photosensor array 140 is higher than that of a correspondingly sized photosensor array 100.

Formation of an image output signal requires both intensity and angular information regarding the light collected. In the case of the photosensor array 100 (as in FIG. 1), angular information is acquired by virtue of the collimation channels 124. In the case of the photosensor array 140 (as in FIG. 2) angular information is extracted based on the relative light intensity detected by the plurality of photosensors A-R. Light arriving at a particular solid angle Ω, is substantially normal to the light-receiving surface 112 of photosensor L. The light-receiving surfaces 112 of other photosensors are positioned at respective angles with respect to the incident light rays.

It should be noted that, while FIG. 2 shows a convex hemispherical array of photosensors, one of skill in the art would understand that a concave photosensor array could also be used. Nor is the invention limited to arrays of hemispherical form. A wide variety of alternative shapes could be employed to good effect.

Figure 3:
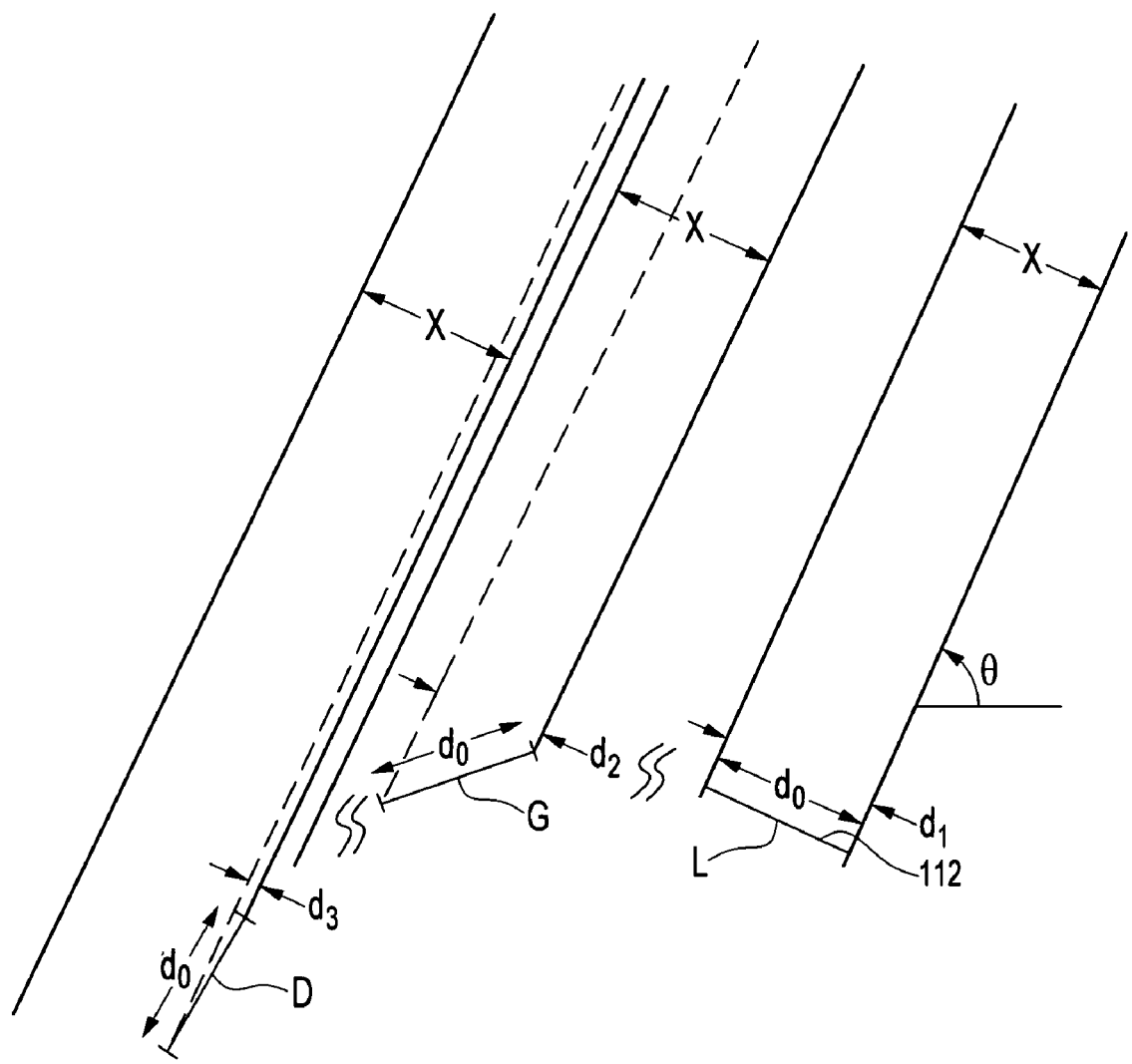
FIG. 3 shows a plurality of photosensors having different respective orientations according to one embodiment of the invention.

Referring now to FIG. 3, the geometric arrangement of exemplary photosensors D, G and L is considered in further detail. Each of photosensors D, G and L have equal area, and are equal in a lateral dimension d0. As noted above, light arriving at solid angle Ω is substantially normal to the light-receiving surface 112 of photosensor L. As a result, photosensor L has an effective dimension d1 that is substantially equal to dimension d0.

Photosensor G is disposed at a first non-normal angle with respect to the incoming rays of light. Consequently, although photosensor G has, like photosensor L a dimension d0, it presents to the incoming rays of light an effective dimension d2 that is smaller than d1. Consequently, for a given intensity of light source, a responsive signal produced by photosensor G is smaller than the corresponding signal produced by photosensor L.

Photosensor D is disposed at a second angle farther from normal, with respect to the incident light rays, than either photosensor G or photosensor L. Accordingly, photosensor D have a correspondingly smaller effective dimension d3 and generates a correspondingly smaller output signal in response to light arriving from light source Y.

Figure 4:
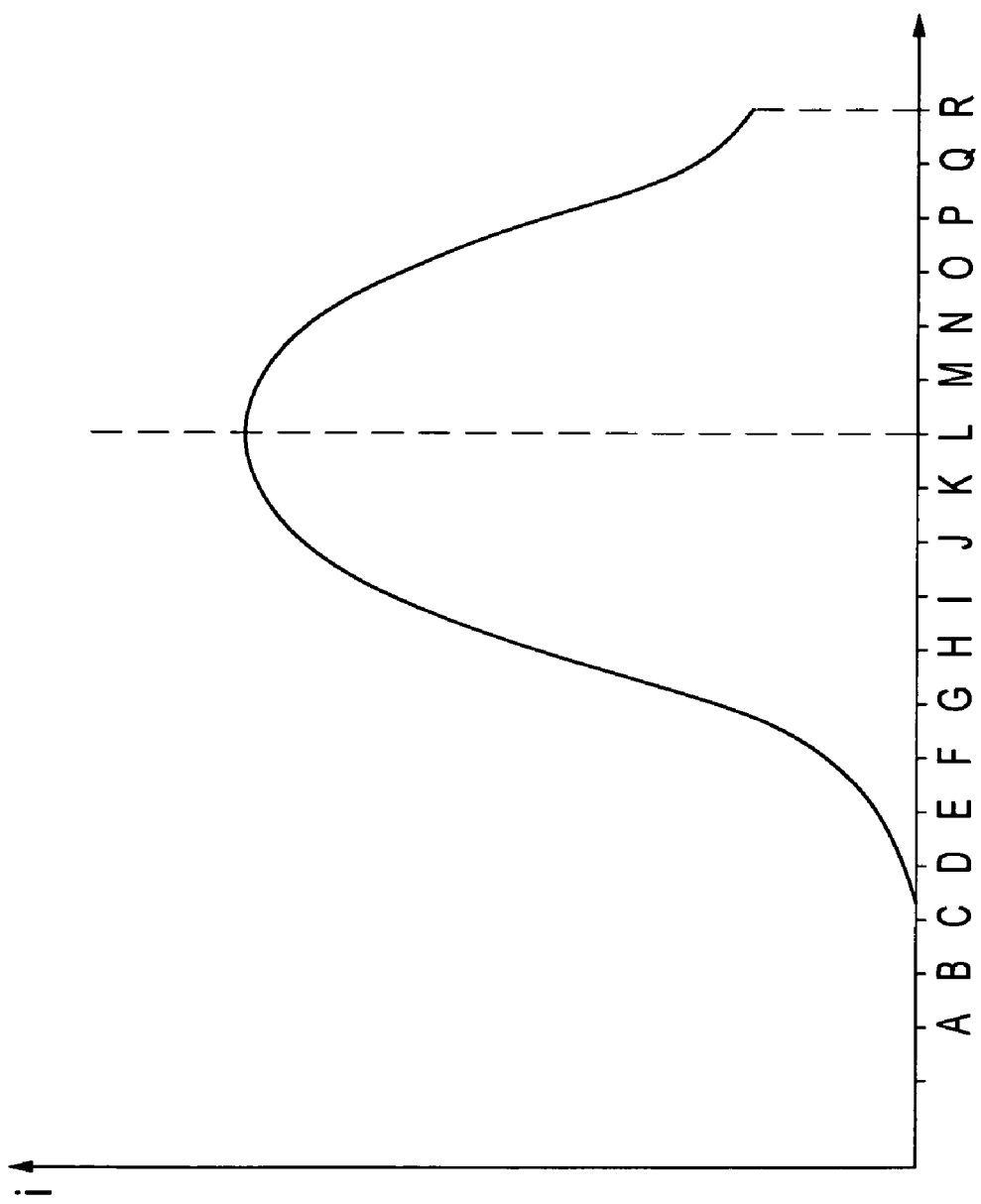
FIG. 4 shows an idealized response curve of a digital imaging system.

FIG. 4 shows a curve that graphically represents output signal values produced by photosensors A-R of photosensor array 140 in response to light received from a light source Y. The curve of FIG. 4 has been smoothed for simplicity of presentation. As is evident from the figure, a signal of maximum value is produced by photosensor L, while the other photosensors of photosensor array 140 produce signals of less than the maximum value according to their respective geometric orientations.

Figure 5:
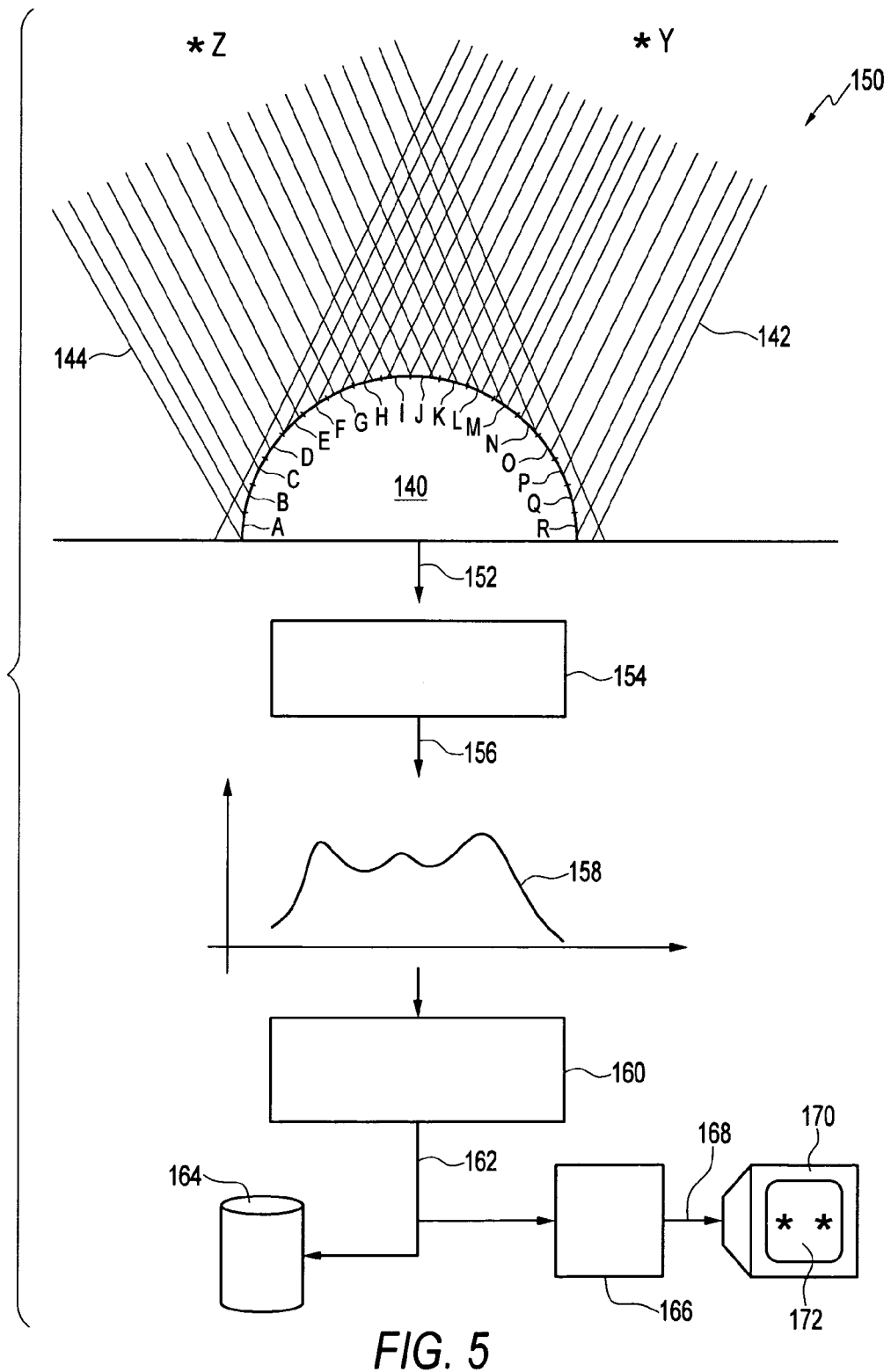
FIG. 5 shows, in block diagram form, a digital imaging system according to one embodiment of the invention.

FIG. 5 shows an image acquisition system 150 according to one aspect of the invention. The image acquisition system 150 includes a photosensor array 140 coupled to an analog to digital converter 154. The analog to digital converter 154 is, in turn, coupled to a computer processor 160. The computer processor 160 may be coupled to a digital memory device 164 and/or a display terminal 170.

As shown in FIG. 5, photosensor array 140 receives light 142, 144 from a plurality of light sources (e.g., Y, Z) disposed in an image plane at infinity. A plurality of light sensors A-R of the photosensor array 140 produce a corresponding plurality of analog electronic signals 152. The analog electronic signals 152 are converted to a corresponding plurality of digital signals 156 by an analog to digital converter 154. The plurality of digital signals 156, taken together, form an intermediate image signal 158 that may be represented as a first plurality of numerical values in a mathematical matrix. The intermediate image signal 158 is received into a computer processor 160 (for example, a digital signal processor). The computer processor 160 operates on the first plurality of numerical values of the mathematical matrix to produce a second plurality of numerical values. The second plurality of numerical values may be received as a digital electronic signal 162 from the computer processor 160 at a digital memory 164 for short or long-term storage of the second plurality of numerical values. The digital electronic signal 162 may also be received at a display circuit 166 adapted to produce a display signal 168. The display signal 168 is received from the display circuit 166 at a display terminal 170, whereby an image 172 corresponding to the light received from the light sources Y, Z in the image plane is displayed by the display terminal 170.

An image is formed by inverting the response of the photosensors to light incident from various angles. This can be achieved in the continuous case by the analytical solution of a Fredholm integral equation of the first kind, or in the discrete case by inverting a matrix containing values representing the response of the photosensors. In order to have a reasonable solution to the discrete problem, the number of sensors in the photosensor array must be comparable to the number of pixels desired in the image plane.

The spherical harmonics satisfy equation 1, as shown below.

$$\nabla^2 Y_l^m(\theta,\phi) = -l(l+1) Y_l^m(\theta,\phi) \quad \text{I}$$

As would be understood by one of skill of the art:

$$(\nabla^2+2)\cos\theta = 0 \quad \text{II}$$

$$(\nabla^2+2)0 = 0 \quad \text{III}$$

Therefore:

$$(\nabla^2+2)\max(\cos(\theta),0) = 0 \quad \text{IV}$$

is true everywhere except at $$\theta = \frac{\pi}{2}.$$

More specifically:

$$(\nabla^2+2)\cos\theta = \delta(\theta) \quad \text{V}$$

The intensity operator transforms as a scalar under rotations, so by the Wigner-Eckhart theorem, it preserves irreducible representations of SO(3) and is a multiple of the identity in each representation. The coefficient can be determined by considering the action of the operator on a point light source and combining with the previous result about the Laplacian.

VI:

$$\int Y_1^0(\theta, \phi) \left(\frac{1}{2\pi}\delta(\theta)\right) d\Omega = 1$$

VII:

$$\int Y_1^0(\theta, \phi) \delta\left(\theta - \frac{\pi}{2}\right) = (2\pi)2^{-l}\cos(\pi l/2)\left(\frac{l}{l2}\right)$$

Therefore, the coefficient for $l \neq 1$ is:

VIII:

$$\left(\frac{2\pi}{l(l+1)-2}\right) 2^{-l} \cos(\pi n/2) \left(\frac{n}{n/2}\right)$$

The $l=1$ coefficient is $$\frac{2\pi}{3}.$$

Note that for $l>1$ odd, the coefficient is zero.

In light of the foregoing, one can solve for image intensity in the case of a hemispherical sensor array. Note that in relation to the following, "E" designates the even part and "O" designates the odd part. Suppose the intensity function on the entire sphere is $I(\theta, 0)$. Since the sources lie in $\theta < \pi/2$, I and its first derivatives are zero at $\theta = \pi$.

IX:

$$I(\theta, \phi) = E(\theta, \phi) + O(\theta, \phi)$$

X:

$$O(0) = I(0) - E(0)$$
$$= I(0) - E(\pi)$$
$$= I(0) - I(\pi) + O(\pi)$$
$$= I(0) - O(0)$$

Therefore:

XI:

$$O(0) = 2I(0)$$

Similarly, the fact that the derivative of I is zero at $\pi$ requires:

$$dO(0) = 2dI(0) \quad \text{XII}$$

The value of O at zero determines the $m_z=0$ component, the x-derivative determines the $m_x=0$ component, and the y-derivative determines the $m_y=0$ component. E can then be found from the relation E=I−O. The even component of the source can be determined as described in section 1. The source pattern is twice the even component in the upper hemisphere and zero in the lower hemisphere.

Various processing errors tend to degrade the quality of the image produced by the digital imaging system of the invention. Image quality may be improved by compensating for numerical error in the design of processing algorithms. According to one aspect of the invention, numerical processing algorithms performed by the computer processor include techniques to avoid round-off error. Also, as would be understood by one of skill in the art, error correction techniques may be applied to the data received by the computer processor from the analog to digital converter. Other sources of system noise include photon statistical error. In addition, efforts to enhance the speed of computation by approximation may result in systemic errors. Accordingly error correction and avoidance methods are employed as one aspect of the invention.

According to one embodiment of the invention, the digital imaging system captures one megabyte of data to populate a one million squared poorly conditioned matrix. The poorly conditioned matrix is inverted and the resulting inverse matrix is stored. To produce an image the stored matrix is multiplied by a million entry vector. In principle the multiplication requires 10^12 arithmetic operations.

Figure 6:
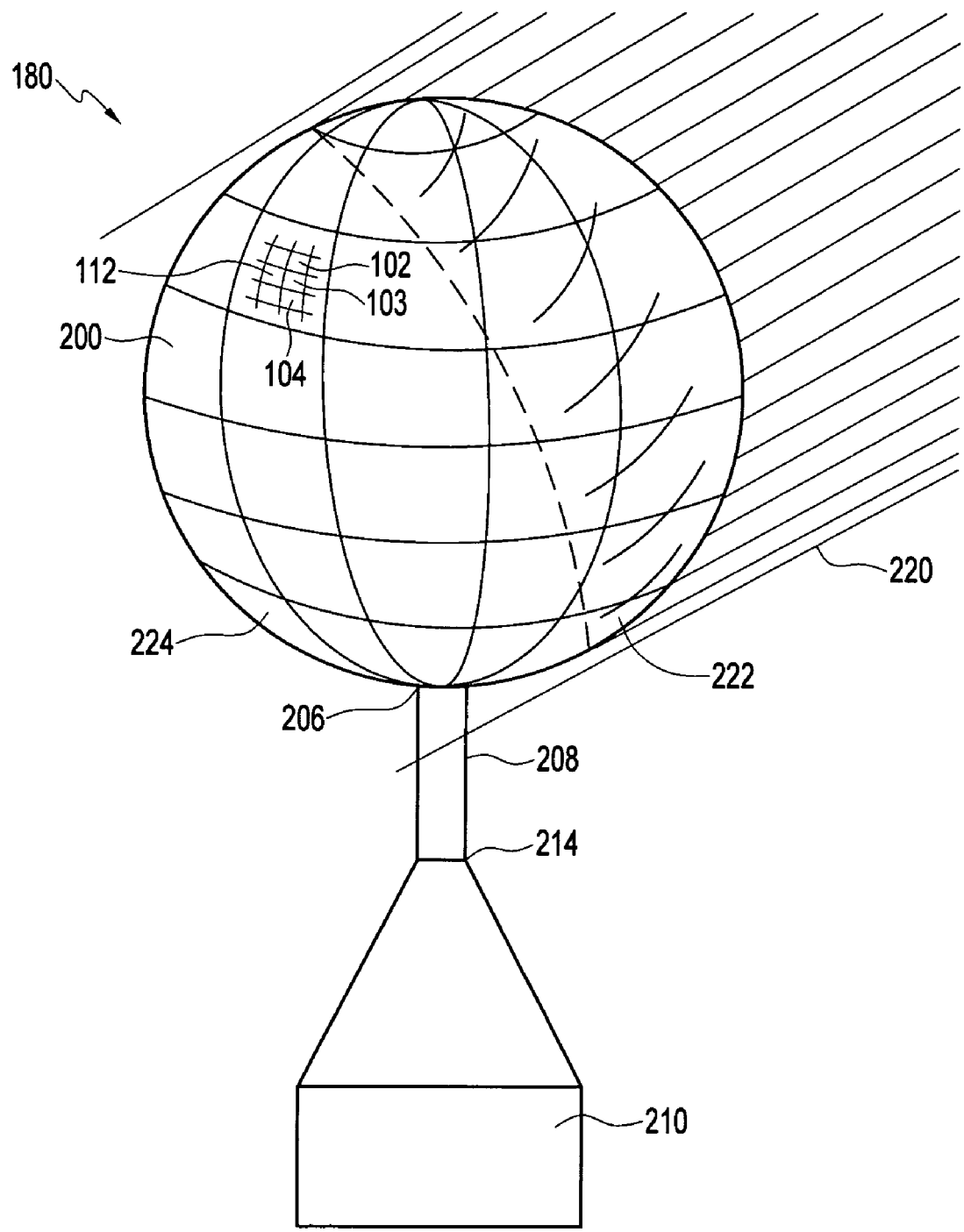
FIG. 6 shows a digital imaging system according to another embodiment of the invention.

FIG. 6 shows a digital imaging system 180 according to a further embodiment of the invention. As shown, the digital imaging system 180 includes a photosensor array 200 with a plurality photosensors 102, 103, 104, etc. The photosensor have respective light-receiving surfaces 112 disposed in an approximately spherical configuration. In one embodiment, the light-receiving surfaces 112 of the individual photosensors are substantially planar. According to one embodiment, the photosensor array 200 is supported or suspended at a first end 206 of a supporting member 208. The supporting member 208 is configured to obscure a minimum number of light-receiving surfaces 112. According to one aspect of the invention, a communication channel within the supporting member 208 allows signals produced by the plurality of photosensors 102, 103, 104, etc. to be received by a processing system 210 coupled to a second end 214 of the supporting member 208.

As shown in FIG. 6, light rays 220 from a sufficiently remote light source arrive in parallel at the light-receiving surfaces 112 of the photosensor array 200. By virtue of the substantially spherical shape of the photosensor array 200, approximately one-half 222 of the array is illuminated by the incoming light. The other half 224 of the photosensor array 200 remains in darkness. The photosensors 102, 103, 104, etc. receive different intensities of the incoming light 220 depending on their location in the photosensor array 200. The light-receiving surface most nearly normal to the incoming light rays produces a strongest output signal, while the light-receiving surface least nearly normal to the incoming light rays produces a weakest output signal. The respective signals from all of the photosensors 102, 103, 104, etc. are processed in the manner described above (with respect to photosensor array 140) to produce an output image signal.

Figure 7A:
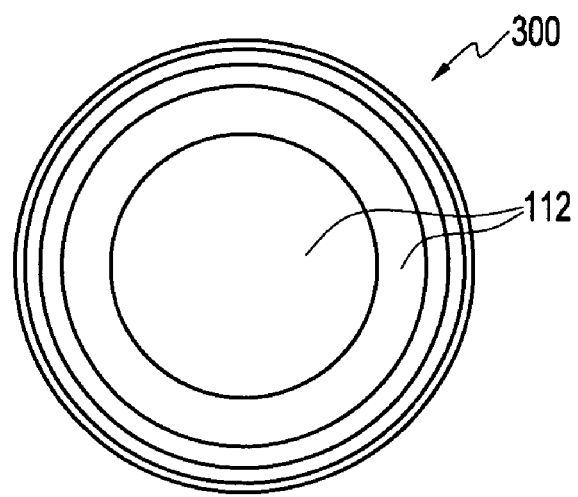
FIGS. 7a and 7b show respective top and sectional views of a portion of a digital imaging system, including a plurality of photosensors disposed in a fresnel pattern.

FIG. 7a shows a top view of a circular photosensor array 300 according to a further embodiment of the invention. In FIG. 7a, the light-receiving surfaces 112 of the photosensor array 300 are disposed in a fresnel pattern, rather than in the hemispherical pattern employed for photosensor array 140.

Figure 7B:
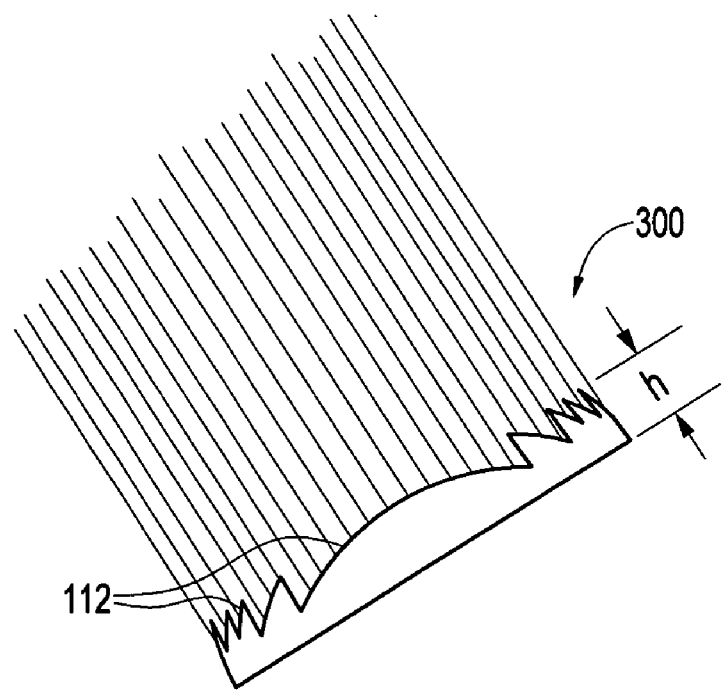

As shown in FIG. 7b, a thickness value h of the photosensor array device 300 is less than a corresponding thickness of photosensor array 140. However, photosensors may be disposed within the fresnel photosensor array 300 having respective geometrical orientations substantially equivalent to the orientations of corresponding photosensors of the hemispherical photosensor array 140.

Figure 8:
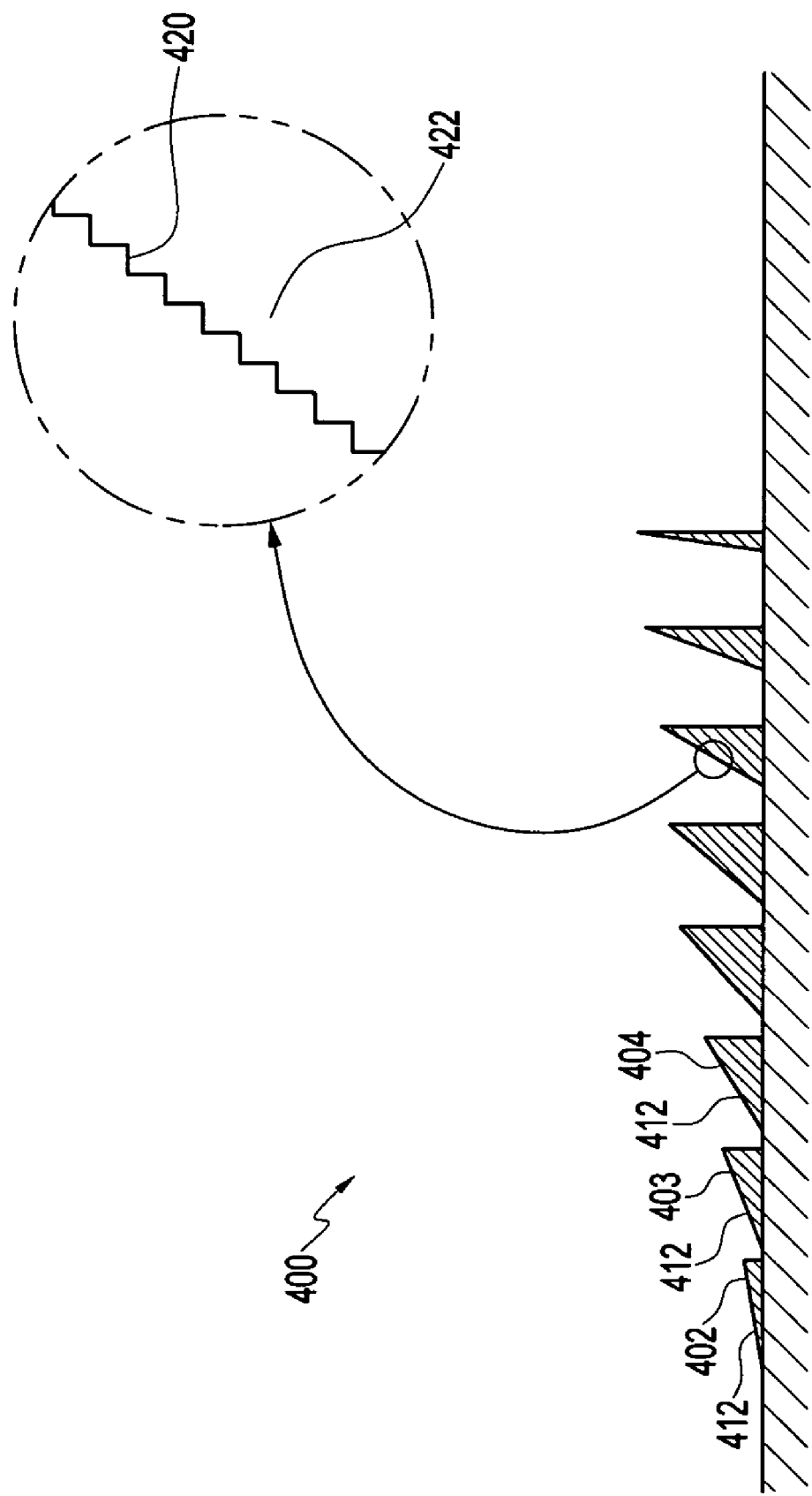
FIG. 8 shows a portion of a digital imaging system including an arrangement of photosensors according to one embodiment of the invention.

FIG. 8 shows a further embodiment of the invention including a photosensor array 400. The array 400 includes photosensors 402, 403, 404 which are placed at various angles with respect to an image plane. Unlike the fresnel photosensor array 300, which exhibits circular symmetry, photosensors 402, 403, 404 of a particular angle may be placed at any location that is convenient from a manufacturing or application perspective. According to one embodiment, the photosensors may be formed on a silicon substrate. Each photosensor, 402, 403, 404 has a light-receiving surface 412. The light receiving surfaces 412 need not be smooth on a scale comparable to the wavelength of incident light. Instead, the light receiving surfaces may include a respective plurality of steps 420 formed in, for example, a silicon material 422.

In one embodiment, the various angles of the photosensors 402, 403, 404 increase according to a linear sequence. For example, successive photoreceptors may be at angles of 0 degrees, 10 degrees, 20 degrees, 30 degrees, etc. In another embodiment, a respective vector originating at a respective center point of each light receiving surface of each photosensor may be directed to an integer location on an arbitrary axis.

Figure 9:
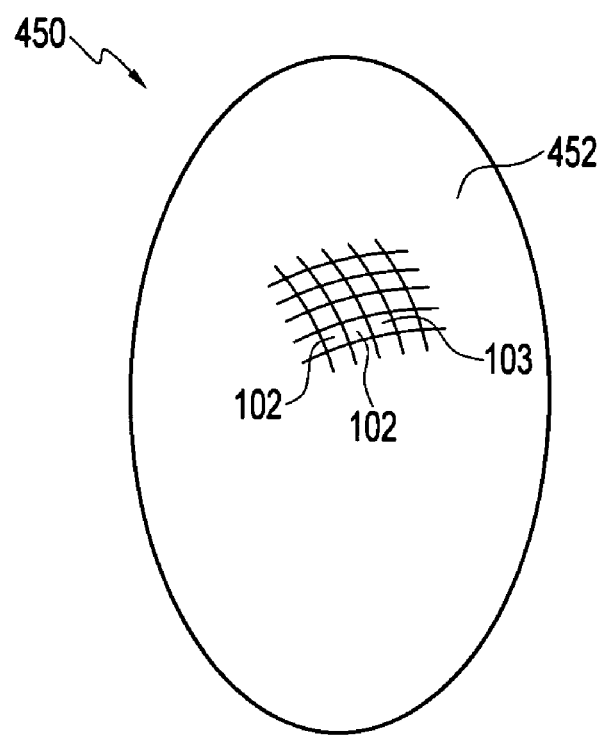
FIG. 9 shows a portion of a digital imaging system including an ellipsoid photosensor array.

FIG. 9 shows a further aspect of the invention according to which the geometrical configuration of the photosensor array may be optimized according to a subject of the image. Accordingly, in one embodiment of the invention as shown in FIG. 9, the light-receiving surfaces of the photosensor array may be arranged in a substantially ellipsoid arrangement. Such an ellipsoid photosensor array may allow optimal imaging of a generally ellipsoid photographic subject such as a human face. One of skill in the art would understand that a wide variety of symmetrical and asymmetrical photosensor arrays may be prepared according to the requirements of a particular photographic subject.

Figure 10:
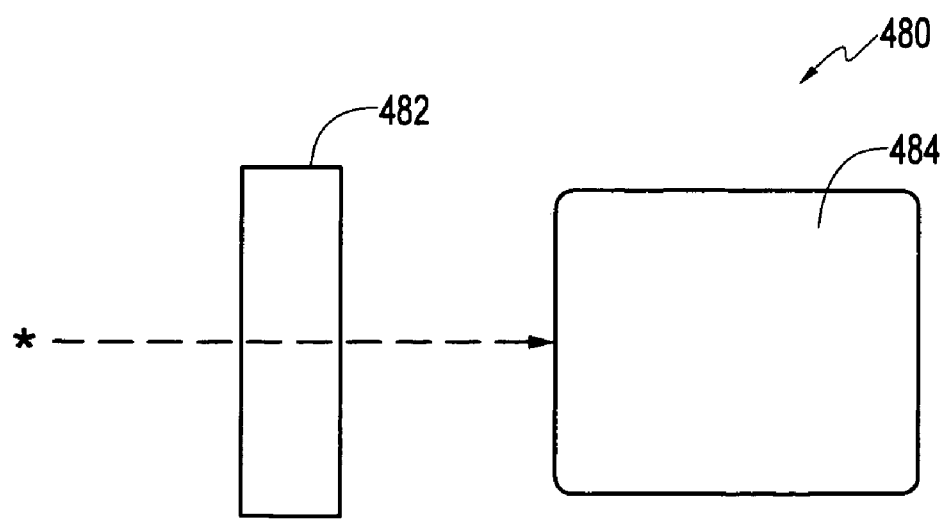
FIG. 10 shows, in block diagram form, a digital imaging system combined with conventional refractive lenses according to one embodiment of the invention.

FIG. 10 shows a further aspect of the invention, in which a digital imaging system 150 may be applied in combination with conventional refractive and/or reflective optics to form a novel optical system 480. Included in the embodiment of FIG. 10 are a lens system 482 and an image acquisition system 484. A lens system 482 may include one or more conventional refractive lenses and/or reflective planar, convex, or concave mirrors. The image acquisition system 484 may include a plurality of photosensor disposed in a respective plurality of orientations with respect to light received from a remote source through the lens system 482.

Figure 11:
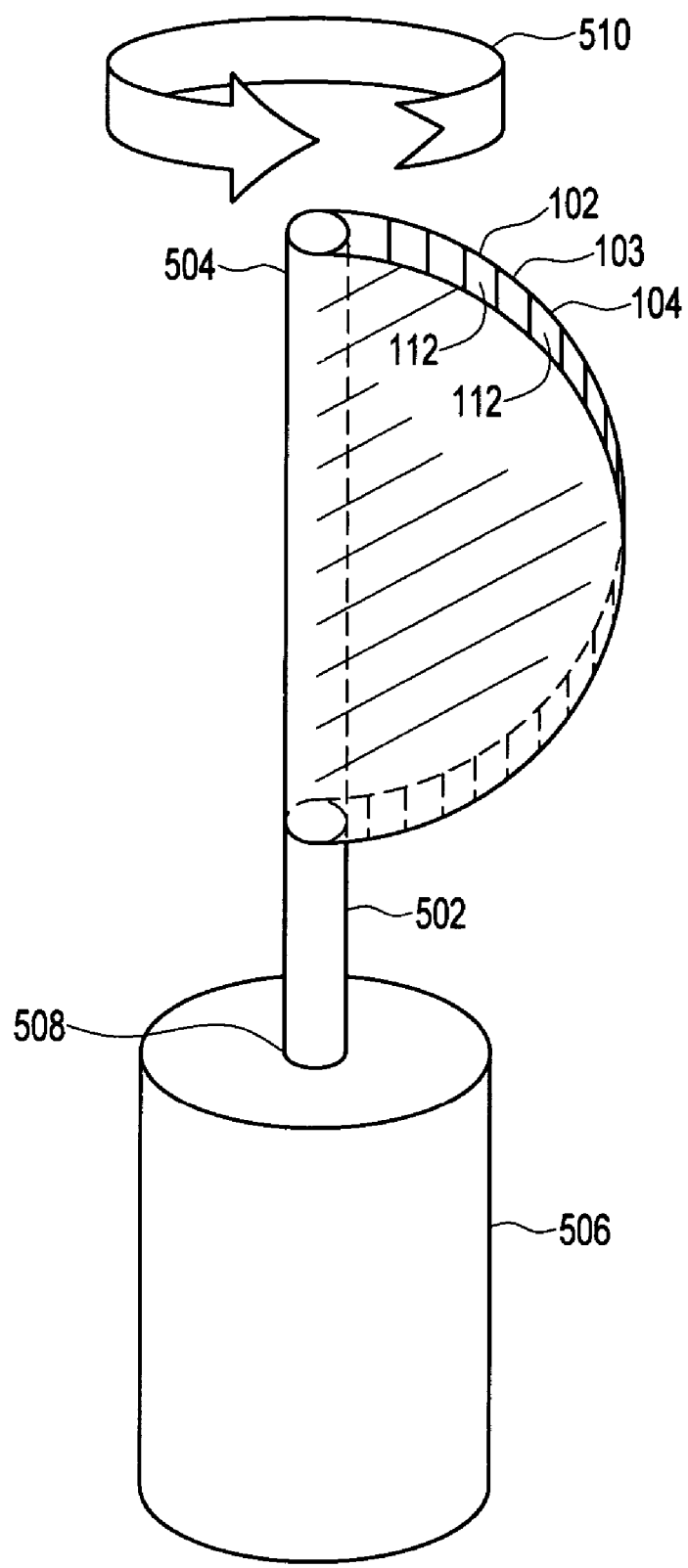
FIG. 11 shows a digital imaging system including a scanning photosensor device.

FIG. 11 shows a further embodiment of the invention including a scanning photosensor device 500. The illustrated embodiment includes a plurality of exemplary photosensors 102, 103, 104 with a respective plurality of light-receiving surfaces 112. The light receiving surfaces are disposed in an arcuate arrangement and coupled to a shaft 502 at a first end 504 thereof. A rotary actuator 506 is coupled to a second end 508 of the shaft 502. The rotary actuator is adapted to rotate the shaft 502 in the manner indicated by arrow 510, whereby the light-receiving surfaces 112 described a substantially spherical surface centered about shaft 502. According to one aspect of the invention, during rotation of the shaft, data is repeatedly acquired from each of the photosensors 102, 103, 104, etc. whereby the acquired data is substantially similar to that which would be acquired from a corresponding spherical photosensor array.

As would be understood by one of skill in the art, alternative scanning motions could readily be blended to address particular application requirements. For example, the shaft 502 could be made to move in a stepped fashion. The shaft could also be made to execute less than a full rotation. In addition, oscillatory motion of the shaft could be effected to allow oversampling by the photosensors 102, 103, 104, etc.

In light of the foregoing, one of skill in the art would understand that other scanning motions are also possible. For example, a single photosensor can be moved through a two-dimensional Cartesian or polar scanning pattern to acquire image information. In another example, a linear array of photosensor elements could be moved in linear fashion to address a two-dimensional set of sensor locations. Multiple linear arrays could also be concurrently or serially transported through a linear motion to allow oversampling, and a wide variety of specialized motions, of constant or varying velocity, could be arranged to address particular light reception applications.

Figure 12A:
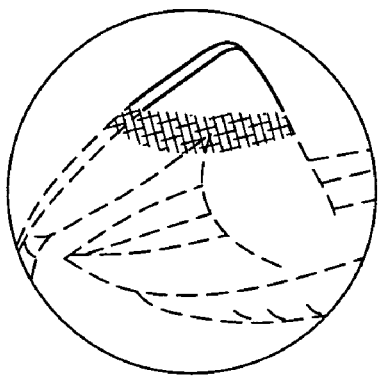
FIGS. 12a-12f show an image having large depth of field according to one embodiment of the invention.
Figure 12B:
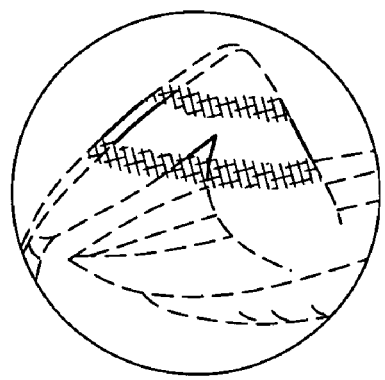
Figure 12C:
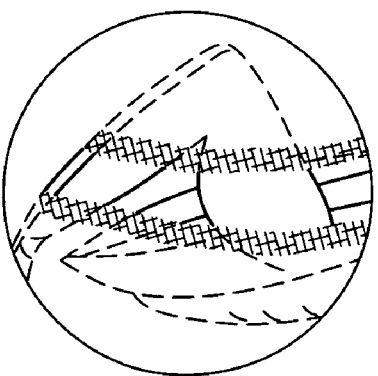
Figure 12D:
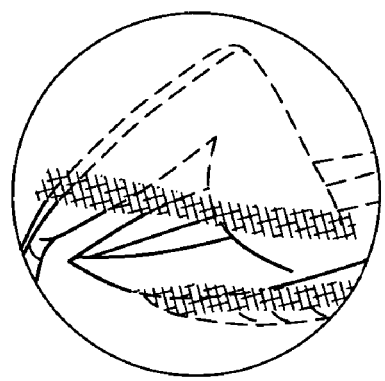
Figure 12E:
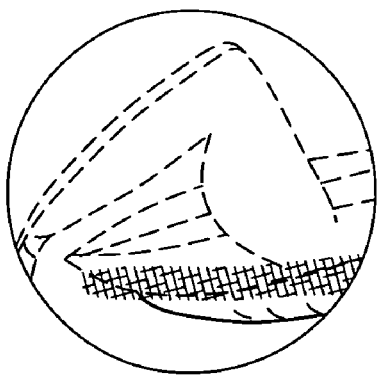
Figure 12F:
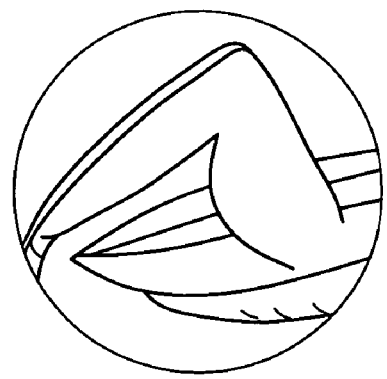

According to a further aspect of the invention, a digital imaging system may be used to provide artificially increased depth of field by integrating a plurality of images acquired at differing focal lengths. FIGS. 12a-12f shows the preparation of an exemplary image formed by integrating a plurality of images taken at a respective plurality of focal planes. In FIGS. 12a-12f, a portion of an insect is shown under magnification. FIG. 12a shows an uppermost portion of the insect portion in clear focus, the balance of the image is unfocused. FIGS. 12b-12e shows successive regions of the insect portion in clear focus. In each case, the areas of the image field outside of the focal plane are unfocused. FIG. 12f shows an image created by computationally integrating the focal plane images of FIGS. 12a-12e into a single image. According to one embodiment of the invention, the data set required for the preparation of the integrated image 12f may be readily acquired and stored in digital form prior to data processing of the data to produce the integrated image.

Figure 13:
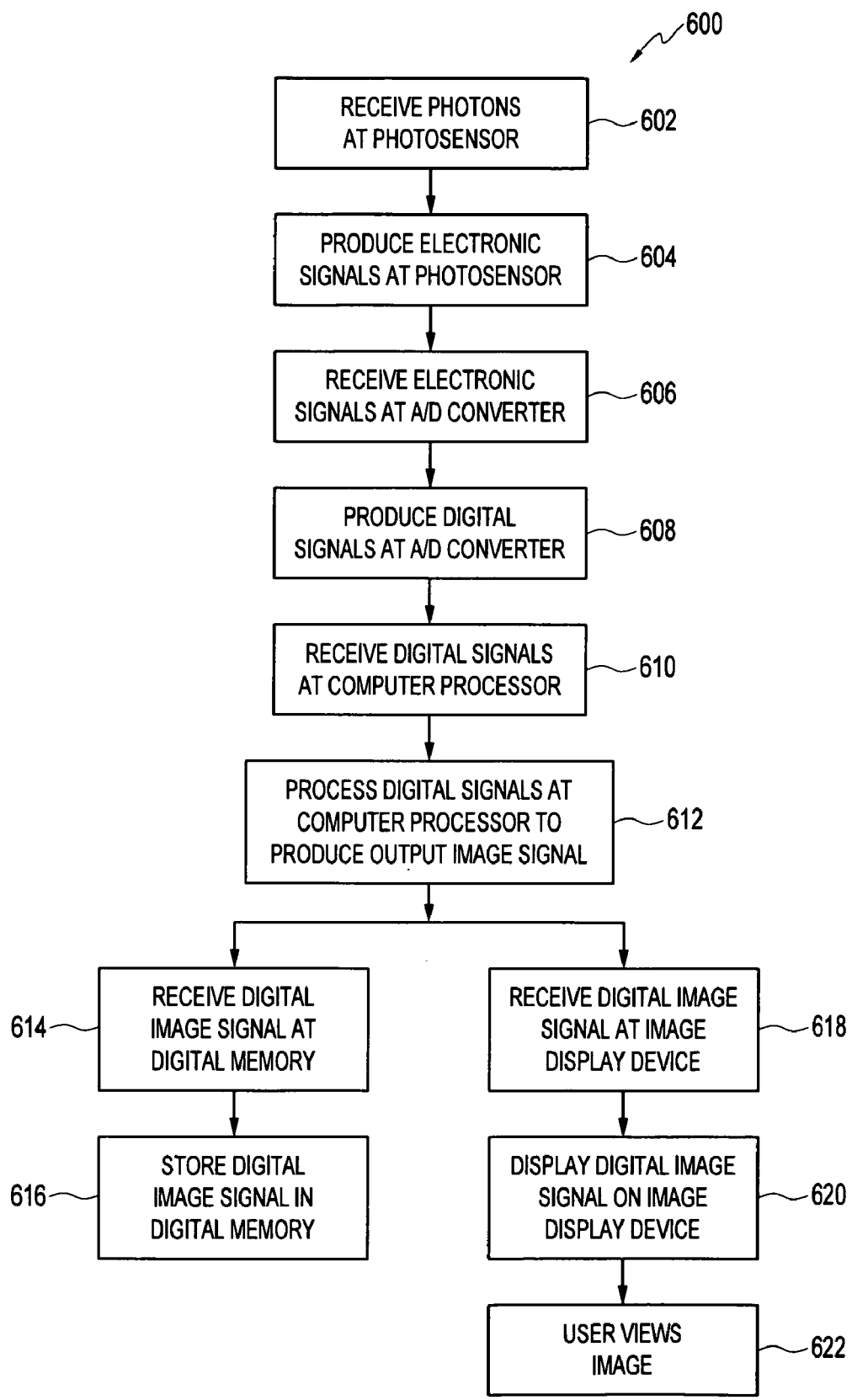
FIG. 13 shows, in flowchart form, a method of forming a focused image according to one aspect of the invention.

According to another aspect of the invention, as shown in FIG. 13, the invention includes a method 600 of producing a focused image that includes several steps. One step 602 of the method includes receiving a flux of photons at one or more photosensor devices. Another step 604 of the method includes producing a plurality of electronic signals at the photosensor devices corresponding to the received photon flux.

Additional steps of the method include receiving the electronic signals from the photosensor devices at respective analog to digital converter devices 606 and producing digital optical or electronic signals related to the electronic signals 608. Further steps of the method include receiving the digital signals into a computer processor 610 and processing the digital signals 612 with the computer processor.

Further steps of the method 600 include receiving the output image signal at a digital memory device 614; storing a representation of the output image signal within the digital memory device 616; receiving the output image signal at a display device 618; outputting a visual representation of the output image signal from the display device 620; and allowing a user to optically perceive the visual representation of the output image signal 622.

Figure 14:
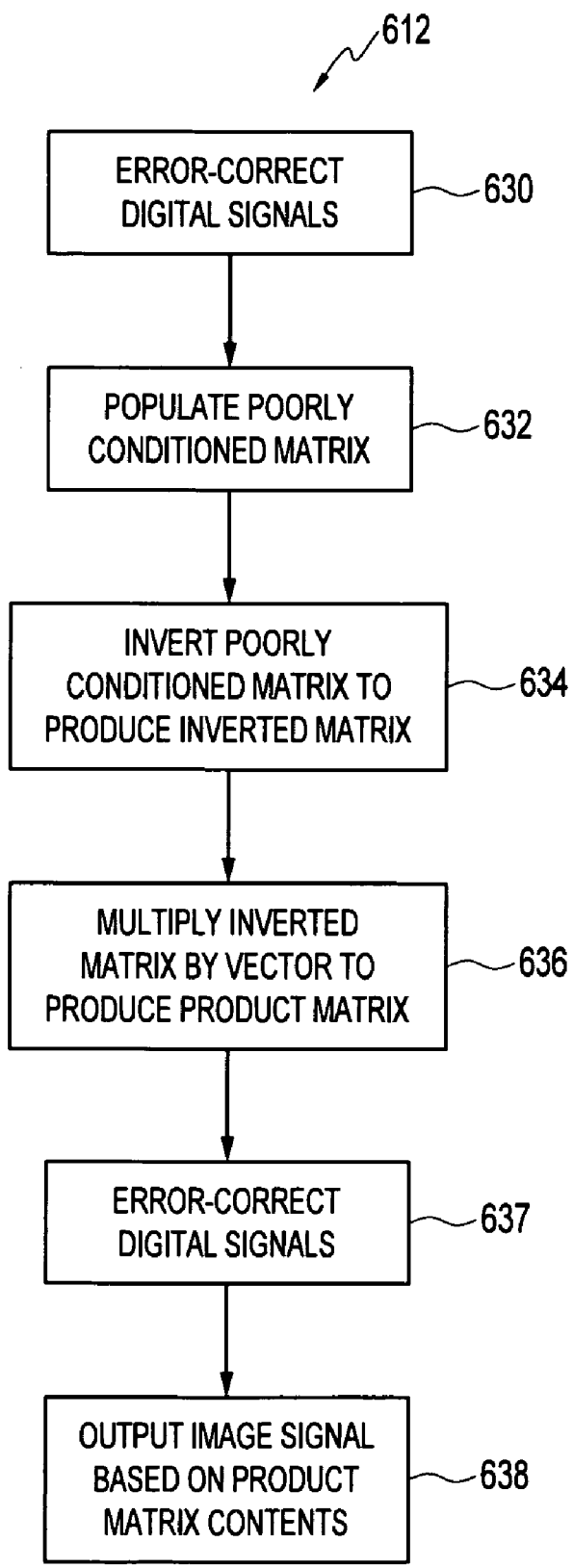
FIG. 14 shows, in additional detail, a method of forming a focused image according to one aspect of the invention.

As shown in FIG. 14, the steps of processing the digital signals 612 with the computer processor includes error-correcting the digital signals to produce corrected digital signals 630, 637; using the corrected digital signals to populate a matrix represented in a memory of the computer processor 632; mathematically inverting the matrix represented in the memory of the computer processor to produce an inverted matrix in the memory of the computer processor 634; multiplying the inverted matrix by a vector to produce a product matrix in the memory of the computer processor 636; and outputting a plurality of values from the product matrix in the form of an output image signal 638.

Although the exemplary embodiments discussed above include imaging systems for visible wavelength radiation, one of skill in the art would understand that the invention may be readily adapted to receive radiation of a wide range of wavelengths including gamma radiation, X-radiation, ultraviolet radiation, infrared radiation, microwave radiation and radiofrequency radiation. In addition, the photosensor arrays may be readily adapted to acquire information related to image color.

Figure 15:
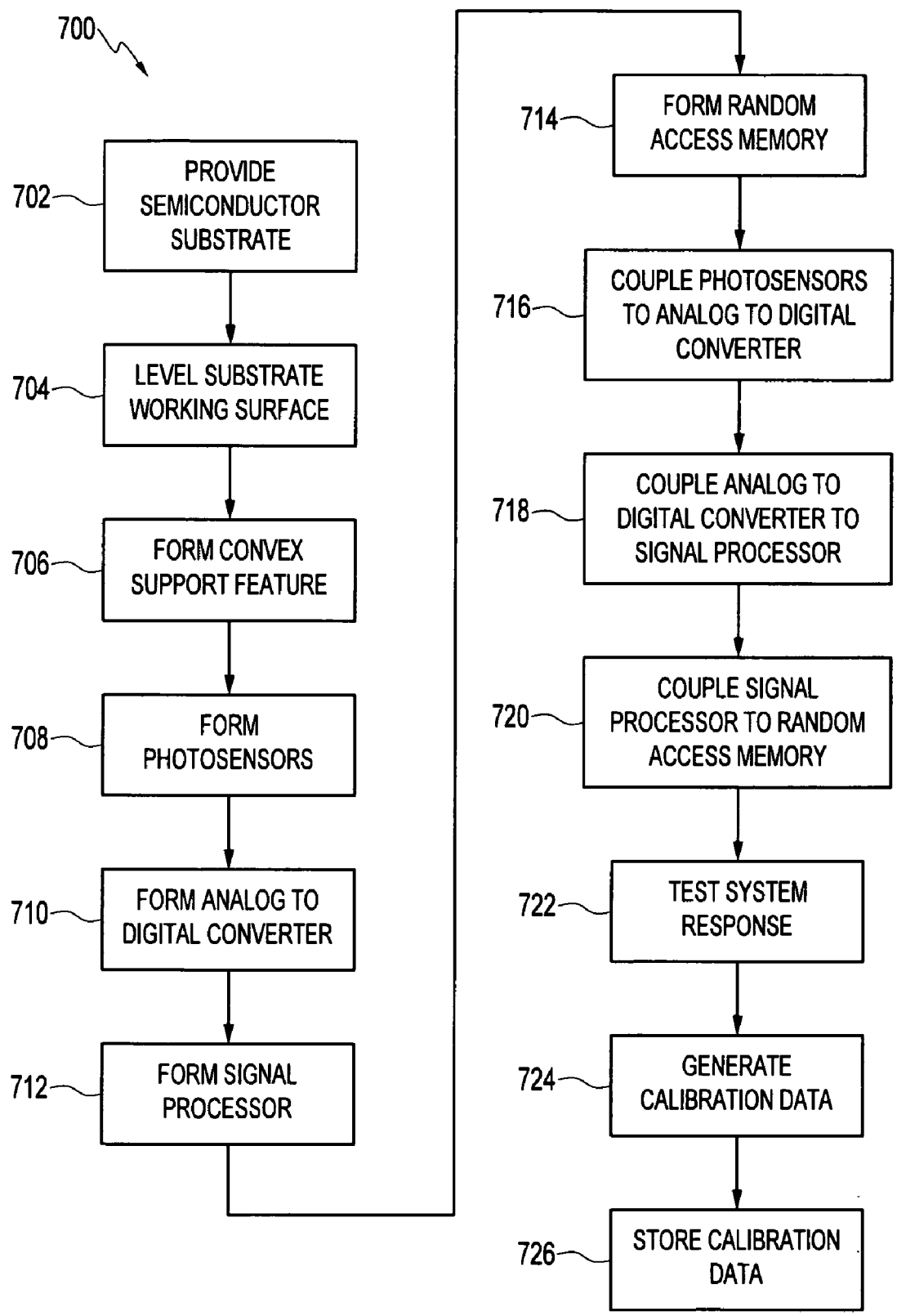
FIG. 15 shows, in flowchart form, a method of manufacturing and imaging system according to one embodiment of the invention.

FIG. 15 shows a process 700 for manufacturing a photodetector device according to one aspect of the invention. As shown in FIG. 15, the process includes providing an appropriate semiconductor substrate 702. As would be understood by one of ordinary skill in the art, in various embodiments the substrate may be a silicon substrate, a compound semiconductor substrate, a diamond substrate, a quartz glass substrate, or a polymer substrate, among others. The substrate is formed to include a substantially flat region. The flat region may be leveled and smoothed 704 by known processes including, for example, mechanical polishing, etching, and chemical mechanical processing. In a further processing step 706 a convex or concave region is formed on the substrate. This convex or concave region may be formed by deposition or removal of material.

A plurality of photosensors are formed 708 on an upper surface of the convex or concave region. In one embodiment of the invention, one or more analog to digital converter circuits are formed on the flat region of the substrate 710. A signal processor circuit may also be formed on the flat region of the substrate 712 according to one aspect of the invention, and in another aspect of the invention, a random access memory device may be formed 714 on the flat region of the substrate. The analog to digital converter circuits, the signal processor circuit and the memory device may be formed according to conventional methods, including masking, etching, mask removal, and deposition, as would be understood by one of skill in the art.

In like fashion, conventional plating and sputtering methods may be employed, along with masking and etching, to form interconnect circuitry. The interconnect circuitry may be of metallic, or otherwise conductive materials, and may be used to couple the photosensor is to the analog to digital converter 716, to couple the analog to digital converter to the digital signal processor 718, and to couple the signal processor to the random access memory device 720.

After forming and interconnecting the various devices as described above, the manufacturing process may include testing of the photodetector device 722, including calibration testing, temperature stress testing, illumination stress testing, and other testing as would be understood by one of skill in the art. In the course of device testing, calibration data may be acquired 724. This calibration data may be stored in the random access memory 726, or otherwise used to modify the performance of one or more of the photosensor devices. Accordingly, process variation exhibited by the various photosensor devices may be compensated for by executing calibration and trimming steps during or after manufacturing of the array. Other corrective actions, as known in the art, including the provision and substitution of redundant photosensors in an array during manufacturing, would be readily applied to the subject photosensor arrays.

While preferred embodiments of the invention have been described and illustrated above, it should be understood that these are exemplary of the invention and are not to be considered as limiting. Accordingly, the invention is not to be considered as limited by the foregoing description, but is only limited by the scope of the claims appended hereto.

The invention claimed is:

1. An image processing system comprising:
means for converting un-refracted light to an electronic signal, said electronic signal being related to an intensity of said light and an orientation of a propagation vector of said light;
means for converting said electronic signal into a focused image signal; and
means for displaying a focused image based on said focused image signal.

2. An image processing system as defined in claim 1 wherein said means for converting un-refracted light to an electronic signal comprises a detector having a generally convex surface region, said generally convex surface region including a plurality of photodetector devices.

3. An image processing system as defined in claim 2 wherein said generally convex surface region comprises a generally hemispherical surface region.

4. An image processing system as defined in claim 2 wherein said generally convex surface region comprises a generally ellipsoidal surface region.

5. An image processing system as defined in claim 2 wherein at least one photodetector device of said plurality of photodetector devices includes a substantially planar surface region, said substantially planar surface region being disposed substantially parallel to a tangent of said generally convex surface region.

6. An image processing system as defined in claim 2 further comprising a collimator device, said collimator device including it plurality of collimation passages corresponding to said plurality of photodetector devices respectively.

7. An image processing system as defined in claim 2 wherein said means for converting un-refracted light to an electronic signal comprises an analog-to-digital conversion device, said analog-to-digital conversion device being operatively coupled to at least one photodetector device of said plurality of photodetector devices.

8. An image processing system as defined in claim 7 wherein said means for converting said electronic signal to a focused image signal comprises a programmable microprocessor device, said programmable microprocessor device being operatively coupled to said analog-to-digital conversion device.

9. An image processing system as defined in claim 8 wherein said programmable microprocessor device is adapted to receive and store a plurality of signal values corresponding to a respective plurality of light intensities received at said plurality of photodetector devices.

10. An image processing system as defined in claim 9 wherein said microprocessor device is adapted to store said plurality of signal values according to a matrix representation, and to invert said matrix under software control.

11. An image processing system comprising:
   a detector device, said detector device having a plurality of photodetector regions, said plurality of photodetector regions being adapted to produce a respective first plurality of signals corresponding to an unfocused image of incident light flux; and
   a processor device, said processor device being adapted to convert said first plurality of signals to a respective numerical matrix representation and to operate on said numerical matrix representation of said first plurality of signals to produce a second plurality of signals, said second plurality of signals corresponding to a focused image signal wherein said detector device comprises a curved surface region, said curved surface region including said plurality of photodetector regions.

12. An image processing system as defined in claim 11 wherein said curved surface region comprises a substantially convex surface region.

13. An image processing system as defined in claim 11 wherein said curved surface region comprises a substantially concave surface region.

14. An image processing device as defined in claim 11 wherein said curved surface region comprises a generally hemispherical surface region.

15. An image processing system as defined in claim 11 wherein said curved surface region comprises a generally ellipsoidal surface region.

* * * * *